_US005178935A_

United States Patent [19]

Saito et al.

[11] Patent Number: 5,178,935
[45] Date of Patent: Jan. 12, 1993

[54] MAGNETIC RECORDING MEDIUM

[75] Inventors: Shinji Saito; Hiroshi Ogawa; Naoyoshi Chino; Hiroo Inaba; Kazuaki Taga, all of Kanagawa, Japan

[73] Assignee: Fuji Photo Film Co., Ltd., Kanagawa, Japan

[21] Appl. No.: 419,238

[22] Filed: Oct. 10, 1989

[30] Foreign Application Priority Data

Oct. 11, 1988 [JP] Japan .................. 63-253901
Oct. 13, 1988 [JP] Japan .................. 63-255969
Oct. 18, 1988 [JP] Japan .................. 63-260500

[51] Int. Cl.$^5$ ............................. G11B 23/00
[52] U.S. Cl. ..................... 428/212; 428/336; 428/425.9; 428/694; 428/900
[58] Field of Search ............ 428/425.9, 336, 694, 428/900, 212

[56] References Cited

U.S. PATENT DOCUMENTS 4,741,953 5/1988 Katsuta et al. ............ 428/900
4,844,946 7/1989 Komatsu et al. ........... 428/694
4,980,230 12/1990 Saito et al. ................ 428/900

Primary Examiner—Paul J. Thibodeau
Assistant Examiner—Leszek Kiliman
Attorney, Agent, or Firm—Sughrue, Mion, Zinn, Macpeak & Seas

[57] ABSTRACT

A magnetic recording comprising a non-magnetic support having thereon first and second magnetic layers containing a binder and a ferromagnetic powder. In a first embodiment, the content of the binder in each magnetic layer containing a vinyl chloride resin or a cellulose resin is characterized in relation to the quantity of the ferromagnetic powder contained therein. In a second embodiment, each of the magnetic layers is characterized in terms of a difference in glass transition point of a polyurethane resin contained therein. In a third embodiment, each of the magnetic layers is characterized in terms of thickness and polyisocyanate content, wherein the content of the polyisocyanate in the first magnetic layer is at least one part by weight larger than the amount of the polyisocyanate in the second magnetic layer.

13 Claims, No Drawings

MAGNETIC RECORDING MEDIUM

FIELD OF THE INVENTION

This invention relates to a multilayer type magnetic recording medium having at least a first magnetic layer (lower layer) and a second magnetic layer (upper layer) and, more particularly, to a multilayer type magnetic recording medium having improved surface properties, running durability and magnetic conversion characteristics.

BACKGROUND OF THE INVENTION

Magnetic recording media are widely used as audio tapes, video tapes, floppy disks, etc. A magnetic recording medium is fundamentally composed of a non-magnetic support having formed thereon a magnetic layer comprising a powdery ferromagnetic material dispersed in a binder.

Hitherto, a magnetic recording medium such as a magnetic recording tape, etc., is generally produced by coating a coating composition comprising a dispersion of a ferromagnetic powder dispersed in a binder dissolved in a solvent on a web-form non-magnetic support continuously travelling in the lengthwise direction and, after drying the coated layer, cutting the support having the magnetic layer formed thereon.

However, in the production of a magnetic recording tape, to increase the sensitivity and improve the S/N ratio thereof, it is necessary to make the directions of ferromagnetic powders uniform in the travelling direction of the non-magnetic support to increase the squareness ratio (the value obtained by dividing the residual magnetization Br by the saturation magnetization Bm) of the coated magnetic layer. Hence in producing a magnetic recording tape, etc., a process has hitherto been employed wherein a magnetic field is applied to the coated layer while the layer is in wet condition in the travelling direction of the nonmagnetic support by a permanent magnet or a solenoid to render uniform the direction of the easy magnetization axes of the ferromagnetic powders (i.e., to orient the ferromagnetic powders).

A magnetic recording medium had to have high levels of various characteristics, such as electromagnetic conversion characteristics, running durability, running performance, etc., thereof. More specifically, in audio tapes for recording and reproducing music, a higher original-reproducing capability has been required and also in video tapes, excellent electromagnetic conversion characteristics such as excellent original image-reproducing capability, etc., have been required.

Also, recently, it has been strongly desired to increase the memory capacity and the recording and reproducing output of magnetic recording disks and magnetic recording tapes.

To increase the memory capacity, it is, as a matter of course, necessary to increase the information recording density per unit area of a magnetic recording medium. On the other hand, to increase the information recording density, the writing magnetic flux generated from a magnetic head must be concentrated in a fine area. Thus, the magnetic head must be minimized and the amount of the magnetic flux generated therefrom reduced.

For inverting the direction of magnetization of a magnetic layer by the fine amount of the magnetic flux thus reduced, it is necessary to reduce the volume of the magnetic layer. Hence it can be said that if the thickness of the magnetic layer is not reduced, complete magnetization inversion cannot be formed.

By the aforesaid reason, for meeting the aforesaid requirement, the thickness of the magnetic layer must be reduced.

On the other hand, to increase the recording and reproducing output of a magnetic layer, the residual magnetic flux of the magnetic layer must be reduced. One method to achieve this is to increase the thickness of the magnetic layer, however, if the thickness of the magnetic layer is increased, high frequency characteristics are deteriorated. Accordingly, to increase the residual magnetic flux and to improve high frequency characteristics, the coercive force of the magnetic material must be increased in addition a reduction in the thickness of the magnetic layer. That is, when the thickness of a magnetic layer containing a magnetic material having a high coercive force is reduced, the high frequency characteristics are improved but the low frequency characteristics are reduced. Furthermore, if the thickness of a magnetic layer containing a magnetic substance having a high coersive force is increased, a magnetic field acts on the surface thereof only at high frequency, whereby a record recorded on the magnetic layer tender to be difficult to erase.

Thus, as a magnetic recording medium having both characteristics, a magnetic recording medium composed of a support having formed thereon a relatively thick magnetic layer containing a magnetic material having a relatively low coercive force and a large residual magnetic flux and a thin magnetic layer containing a magnetic material having a high coercive force formed on the thick magnetic layer is ideal. Thus, hitherto, production of a magnetic recording medium by coating two magnetic layers and applying thereto a magnetic orientation treatment has been employed. However, in coating two magnetic layers, it has been confirmed that when the dry thickness of the upper magnetic layer is thinner than 2 $\mu$m, the characteristics, such as the squareness ratio, is not so improved as compared in forming an upper magnetic layer having a dry thickness thicker than 2 $\mu$m.

Thus, to solve these problems, JP-A-62-42328 (the term "JP-A" as used herein means an "unexamined published Japanese patent application") provides a process capable of providing superior electromagnetic conversion characteristics by double-coating a first magnetic layer and a second magnetic layer on a support in this order and in this case, a magnetic material having a high coercive force (Hc) is present in the second magnetic layer and a magnetic material having a low Hc is present in the first magnetic layer.

Also, JP-A-62-212933 describes that where two or more magnetic layers are formed on a non-magnetic support, the dry thickness of the uppermost layer being not thicker than 2 $\mu$m, a magnetic recording medium having high characteristics is obtained by simultaneously coating two or more magnetic layers using a simultaneous multi-coating method (wet-on-wet method) and applying thereto a magnetic field while the layers are in a wet condition. Hitherto, it is known that the binder plays an important role in the dispersion of a ferromagnetic powder and a vinyl chloride series resin or a cellulose series resin is usually used as the binder. Thus, in JP-A-62-212933 above, a vinyl chloride series resin or nitrocellulose is used in combination with polyurethane which is a relatively soft binder. However, the combination of these binders results in a somewhat insufficient surface roughness of the magnetic layer as well as Y.S/N (video S/N) and C.S/N (color S/N) thereof and a further improvement has been required.

To solve these problems, it has been proposed to use the binder present in the upper layer (second magnetic layer) and the binder present in the lower layer (first magnetic layer) in a same ratio to the amount of the ferromagnetic powder present in each layer as disclosed in JP-A-62-212933 and JP-A-54-145104 or to use the binder for the upper layer in an amount larger than the amount of the binder for the lower layer (about 25% larger) (the amount of the binder being the amount per unit amount of the ferromagnetic powder) as disclosed in JP-A-58-56231. However, when the binders are used in a same ratio between the upper layer and the lower layer, the surface roughness may be good but Y.S/N and C.S/N are insufficient. Also when the difference in the amount of the binder between the upper layer and the lower layer is large, it has been confirmed that not only surface roughness is increased but also Y.S/N and C.S/N are greatly reduced.

Also, at present, a magnetic recording medium must have a good running durability and the durability of the magnetic recording medium itself, that is, an improved durability with the passage of time under various temperature and humidity conditions, in addition to excellent electromagnetic conversion characteristics.

To obtain good running durability, the functions of abrasives and lubricants usually play an important role.

However, to obtain excellent running durability in a magnetic recording medium using abrasives, it is necessary to increase the addition amount thereof to some extent. This results in a decrease in the content of a ferromagnetic material. Also, in using an abrasive having a large particle size for obtaining excellent running durability, the abrasive tends to protrude excessively beyond the surface of the magnetic layer. Accordingly, improvement in running durability using abrasives is frequently accompanied by a reduction in the electromagnetic conversion characteristics.

Also, in improving the aforesaid running durability using a lubricant, it is also necessary to increase the amount thereof. Thus the binder tends to be plasticized and there is a tendency toward a reduction in the durability of the magnetic layer.

Another method for improving the running durability includes a method of increasing the hardness of the magnetic layer by using a hard binder. However, an increase in the hardness of the magnetic layer adversely influences the magnetic recording medium because the magnetic layer becomes quite brittle, dropout occurs on contact of the magnetic layer with a magnetic head, and the still characteristics of the magnetic recording medium are reduced.

Furthermore, a magnetic recording medium having a binder composition composed of polyisocyanate, a polyurethane series resin having a hydroxy group and a molecular weight of less than 10,000, and a resin having an active hydrogen is disclosed in JP-A-58-153224. A polyurethane series resin (or other resins) having an active hydrogen (such as a hydroxy group) sufficiently reacts (crosslinkage) with polyisocyanate due to the high reactivity with polyisocyanate. As a result, the magnetic layer containing the resin becomes very tough. Accordingly, a magnetic layer having less reduction in output and good durability can be obtained even after storing the magnetic recording medium for a long period of time. However, since this magnetic layer has insufficient adhesive power for a non-magnetic support, a sufficient running durability is not always obtained.

As a magnetic recording medium having both excellent electromagnetic conversion characteristics and running durability, JP-A-63-103429 discloses a magnetic recording medium having on a non-magnetic support two magnetic layers. Each contains a ferromagnetic substance having a coercive force of at least 500 Oe dispersed in a binder, wherein the Young's modulus of the lower magnetic layer (first magnetic layer) formed on the non-magnetic support is from 500 to 1,000 kg/mm$^2$, the Young's modulus of the upper magnetic layer (second magnetic layer) formed on the lower magnetic layer is at least 1,300 kg/mm$^2$, and the Young's modulus of the all of the magnetic layers is at least 900 kg/mm$^2$. In this magnetic recording medium, the lower magnetic layer has a high buffer action and a good adhesive property due to the softness thereof. Also the upper magnetic layer has a high hardness, thereby the magnetic recording medium is difficult to deform even when it is stored under a high-temperature condition and the running durability thereof is improved.

To obtain such a Young's moduluses in these magnetic layers, a method wherein substantially the same amount of a ferromagnetic material is used for the first magnetic layer (lower layer) and the second magnetic layer (upper layer), and a binder having a Young's modulus lower than the binder for the second magnetic layer is used for the first magnetic layer, a method wherein a same binder is used for the first magnetic layer and the second magnetic layer and the amount of a ferromagnetic material for the first magnetic layer is lower than the amount of a ferromagnetic substance for the second magnetic layer, or a method wherein each of the Young's modulus of the first magnetic layer and the Young's modulus of the second magnetic layer is adjusted by controlling the amount of ferromagnetic material and the kind of the binders for both the magnetic layers can be utilized.

However, JP-A-63-103429 above practically shows that a desired Young's modulus is obtained by using the same binder for the first magnetic layer (lower layer) and the second magnetic layer (upper layer) and changing the amounts of a vinylchloride/vinyl acetate/vinyl alcohol copolymer, which is a relatively hard binder, and polyester urethane, which is a relatively soft binder. Thus with such a combination of polymers, since in the lower layer (first magnetic layer) having a small Young's modulus, the amount of the vinyl chloride copolymer having a relatively good dispersibility becomes less and the amount of polyurethane having a poor dispersibility becomes relatively large, the dispersibility of the lower layer tends to be reduced. Due to the influence thereof, a sufficient surface property of the upper layer (second magnetic layer) is not obtained and, as the case may be, the strength of the upper layer is insufficient.

Furthermore, in an attempt to improve the durability of a magnetic recording medium by improving the chemical structure of a binder to introduce therein a bond which is reluctant to be hydrolyzed, a magnetic recording medium using, for example, a polyurethane resin containing a polyether diol in the molecule is disclosed in JP-A-61-255532. The magnetic recording medium containing such a polyurethane resin has excellent electromagnetic conversion characteristics and shows an excellent durability to the change of temperature and humidity owing to its resistivity to hydrolysis. However, the coefficient of friction is increased and the output is reduced on running. Thus, this magnetic recording medium cannot be said to have sufficient running durability.

As described above, a magnetic recording medium having excellent electromagnetic conversion characteristics, an excellent running durability such that the reduction of the output on running is less, etc., and an excellent durability such that the reduction of output is less even when the magnetic recording medium is stored under various temperature and humidity conditions for a long period of time has not yet been obtained.

On the other hand, to increase the durability, there is a method of using a hardening agent such as an isocyanate, etc. In producing a magnetic recording tape having a double layer structure, a coating after drying system has hitherto been employed. That is, in this coating system, a first magnetic layer is coated on a non-magnetic support and after drying the coated layer, a second magnetic layer is coated and dried. It is known, however, that in this system, by using a large amount of hardening agent for the first magnetic layer, the occurrence of a nonuniform swelling at the interface even when the second magnetic layer is formed after setting of the first magnetic layer. For example, it is disclosed in JP-A-57-135434 that a hardening agent (isocyanate) is used in an amount of 3.75 parts by weight for the last magnetic layer and 1.25 parts by weight for the second magnetic layer based on 100 parts by weight of ferromagnetic substance.

However, recently, a wet-on-wet coating (simultaneous double coating) system has been developed for reducing the thickness of the second magnetic layer, improving the surface property of the first magnetic layer and the second magnetic layer, improving the coating speed, and reducing the production cost.

In this system, it becomes unnecessary to use a large amount of a hardening agent for the first magnetic layer for hardening the layer since the first magnetic layer is formed on the second magnetic layer while the second magnetic layer is in a wet condition and, for example, JP-A-53-144705 discloses that a larger amount of a hardening agent is used for the second magnetic layer.

However, it has recently been found that when the magnetic recording medium is used or stored under various temperature and humidity conditions, the polyurethane resin in the medium is hydrolyzed to form low-molecular weight components, which ooze to cause blooming, etc. When a large amount of a hardening agent is used for the second magnetic layer for preventing the occurrence of this phenomenon, the magnetic layer becomes very hard and hence a sufficient head touch, i.e., the touch of a magnetic head and the magnetic recording tape, is not obtained. Also, good electromagnetic conversion characteristics are not obtained as a result.

SUMMARY OF THE INVENTION

At the result of investigations for solving the problem described hereinbefore as to the deterioration of the characteristics (Y.S/N and C.S/N) in a magnetic recording medium of a double layer structure by utilizing the advantage of the aforesaid vinyl chloride series resin or cellulose series resin as a component of the binder and also utilizing the advantages of performing a double layer coating by the wet-on-wet system, it has now been discovered that the characteristics of the magnetic recording medium are greatly improved by selecting a specific ratio of a ferromagnetic powder to each binder for each of the upper and lower magnetic layers and have succeeded in accomplishing a first embodiment of this invention.

Furthermore, as the result of the various investigations on the relationship of the amount of a hardening agent for the first magnetic layer and the second magnetic layer in a simultaneous double layer coating (wet-on-wet coating) system and the behavior of the low-molecular weight components formed on hydrolysis of the binder and on the glass transition points of the binders for the first magnetic layer and the second magnetic layer, it has been discovered that a magnetic recording medium having simultaneously improved electromagnetic conversion characteristics, running durability, and further durability under various temperature and humidity conditions is obtained.

Therefore, a first object of this invention is to provide a novel double layer magnetic recording medium.

A second object of this invention is to provide a magnetic recording medium having excellent electromagnetic conversion characteristics.

A third object of this invention is to provide a magnetic recording medium which has excellent electromagnetic conversion characteristics and running durability.

That is, accordingly a first embodiment of this invention provides a magnetic recording medium comprising a non-magnetic support having thereon a first magnetic layer (lower layer) and a second magnetic layer (upper layer) in this order, the second magnetic layer being coated on the first magnetic layer while the first magnetic layer is in wet condition, wherein both the first magnetic layer and the second magnetic layer contain a vinyl chloride resin or a cellulose resin as a part of the binder and the amount (A) of the total of the binders for the first magnetic layer to the amount of the ferromagnetic powder for the first magnetic layer and the amount (C) of the total of the binders for the second magnetic layer to the amount of the ferromagnetic powder for the second magnetic layer have the relationship of $(A/C-1) \times 100$ of from $-20\%$ to $-5\%$ or from $+5\%$ to $+20\%$.

In particular, when in the first embodiment of this invention, the amount (B) of the vinyl chloride resin or cellulose resin in the total of the binders for the first magnetic layer to the amount of the ferromagnetic powder and the amount (D) of the vinyl chloride resin or cellulose resin in the total of the binders for the second magnetic layer to the ferromagnetic powder have the relationship of $(B/D-1) \times 100$ of from $-20\%$ to $+20\%$, a more preferred effect is obtained.

According to a second embodiment of this invention, there is provided a magnetic recording medium comprising a non-magnetic support having thereon double magnetic layers each containing a ferromagnetic powder dispersed in a binder, wherein the first magnetic layer (lower layer) contains at least one kind of polyurethane resins each having a glass transition temperature (Tg) of from $-50°$ C. to $-10°$ C. as the binder, the second magnetic layer (upper layer) contains at least one kind of polyurethane resins each having a glass transition temperature (Tg) of from $-20°$ C. to $40°$ C. as the binder, and the difference in the glass transition temperature between the polyurethane resin for the upper layer and the polyurethane resin for the lower layer is at least 10° C. (that is, the glass transition temperature of the polyurethane resin for the upper layer is at least 10° C. higher than the glass transition temperature of the polyurethane resin for the lower layer).

According to a third embodiment of this invention, there is provided a magnetic recording medium comprising a non-magnetic support having thereon a first magnetic layer (lower layer) and a second magnetic layer (upper layer) in this order, the second magnetic layer being coated on the first magnetic layer while the first magnetic layer is in a wet condition, wherein the thickness of the first magnetic layer is from 2.5 $\mu$m to 5.0 $\mu$m, the thickness of the second magnetic layer is from 0.3 $\mu$m to 1.5 $\mu$m, the first magnetic layer contain polyisocyanate in an amount of from 6 to 15 parts by weight to 100 parts by weight of a ferromagnetic powder present in the first magnetic layer the second magnetic layer contains polyisocyanate in an amount of from 3 to 13 parts by weight to 100 parts by weight of the ferromagnetic powder present in the second magnetic powder, and the amount of polyisocyanate present in the first magnetic layer is at least 1 part by weight larger than the amount of polyisocyanate present in the second magnetic layer.

DETAILED DESCRIPTION OF THE INVENTION

In the first embodiment of this invention, the binder used for the magnetic recording medium contains a vinyl chloride series resin or a cellulose series resin and the difference of the total of the binders between the upper layer and the lower layer to the ferromagnetic powder in each layer is at most 20%. If the amount of the binder for the lower layer to the ferromagnetic powder present in the lower layer is less than 80% of the amount of the binder for the upper layer to the ferromagnetic powder present in the upper layer, the dispersibility of the lower layer becomes insufficient. Also, if the amount of the binder for the lower layer to the ferromagnetic powder in the lower layer is above 120% of the amount of the binder for the upper layer to the ferromagnetic powder in the upper layer, the degree of packing of the lower layer is undesirably reduced as well as if the difference of the amounts of both the binders for the layers to the each ferromagnetic powder is 20% or more, in the simultaneous or successive coating by the wet-on-wet coating system in this invention, the surface property after coating is reduced. Also, it is necessary for the difference in the amount of the vinyl chloride series resin or the cellulose series resin in the upper layer to the ferromagnetic powder in the layer and the amount of that in the lower layer is within 20%. If the difference is more than 20%, the surface properties of the double layer are greatly reduced.

In the first embodiment of the invention, the vinyl chloride resin means various copolymers mainly composed of vinyl chloride and examples thereof are copolymers of vinyl chloride and other monomers such as vinyl acetate, acrylic acid, maleic acid, maleic anhydride, methacrylic acid, vinyl alcohol, etc. It is preferred that these copolymers have a polar functional group and examples of such a group are a hydroxy group, a carboxy group, a sulfonic acid group, a metal sulfonate group, a phosphoric acid group, a phosphoric acid ester group, a metal phosphate group, an epoxy group, an amino group, and a cyano group.

Also, examples of the cellulose resins for use in this invention are nitrocellulose, acetyl cellulose, methyl cellulose, acetyl cellulose, ethyl cellulose, cellulose acetate butyrate, cellulose propionate, cellulose acetate propionate, hydroxyethyl cellulose, and carboxymethyl cellulose.

It is preferred for the number average molecular weight of the vinyl chloride resin or the cellulose resin for use in the first embodiment of this invention to be from 5,000 to 50,000, more preferably from 10,000 to 30,000.

In this invention, other resins which are conventionally used as binders for magnetic recording medium can be used together with the vinyl chloride series resin or the cellulose series resin. Typical examples thereof are polyurethane resins and rubber series resins. The binder may contain polyisocyanate as a hardening agent.

In addition, the term "coating the upper layer while the lower layer is in a wet condition" used in the description of this invention means a simultaneous coating method and a successive wet coating method. Such additionally includes not only a coating method using an extrusion coater capable of simultaneously coating a plurality of coating compositions but also a method where directly after coating the lower layer, the upper layer coated thereon while the lower layer is in a wet condition and a method where the lower layer is previously coated and the upper layer is coated on the lower layer while the lower layer is in undried state.

Also, as to the thickness of the magnetic layers, it is preferred that the dry thickness of the upper layer is not thicker than 2 $\mu$m, more preferably not thicker than 1 $\mu$m, and is thinner than the lower layer.

The reason why the magnetic recording medium having excellent electromagnetic conversion characteristics is obtained in the first embodiment of this invention has not yet been clarified but is considered to be as follows.

That is, while not desiring to be bound it is considered that if the amount of the binder for the lower layer to the ferromagnetic powder in the lower layer is from 80 to 95% of the amount of the binder for the upper layer to the ferromagnetic powder in the upper layer, the surface property of the lower layer after coating improves. On the other hand, it is also considered that if the amount of the binder for the lower layer to the ferromagnetic powder in the lower layer is from 105 to 120% of the amount of the binder for the upper layer to the ferromagnetic powder in the upper layer, the processability of the lower layer with a calender treatment is improved. Also, it has been found that if the amount of the binder for the lower layer is lower than 80% or higher than 120% of the amount of the binder for the upper layer, the surface property is greatly reduced as described above and the reason is considered to be that the upper layer and the lower layer are simultaneously dried after coating. Hence, if the difference in the amount of the binder to the ferromagnetic powder between the upper layer and the lower layer is large, a larger difference in shrinkage of the layers on drying of the coated layers occurs causing a disturbance of the interface between the upper layer and the lower layer, whereby the surface property is greatly reduced. It has also been found that in particular, the difference in the amount of a vinyl chloride resin or a cellulose series resin also greatly influences the surface property and the difference of the resin to the ferromagnetic powder must be 20% or less.

Preferred embodiments of the magnetic recording medium in the above-described second embodiment of this invention are as follows.

1) A magnetic recording medium obtained by coating a lower magnetic layer on a non-magnetic support, coating an upper magnetic layer on the lower layer while the lower layer is in a wet condition, and thereafter, orienting, drying, and surface-treating the layer.
2) A magnetic recording medium wherein the amount of the polyurethane resin in each of the lower magnetic layer and the upper magnetic layer is from 10% by weight to 70% by weight of the whole binders in each layer.
3) A magnetic recording medium wherein the difference in the glass transition temperature of the polyurethane resin between the lower magnetic layer and the upper magnetic layer is at least 20° C.
4) A magnetic recording medium wherein the amount of the binder in each of the lower magnetic layer and the upper magnetic layer is from 10% by weight to 70% by weight of the amount of the ferromagnetic powder in each layer.
5) A magnetic recording medium wherein the lower magnetic layer and the upper magnetic layer further contain a polyisocyanate hardening agent as a component of the binder.
6) A magnetic recording medium wherein the lower magnetic layer and the upper magnetic layer further contain a vinyl chloride copolymer resin or a cellulose resin as a component of the binder.
7) A magnetic recording medium wherein the dry thickness of the lower magnetic layer is at least 2 μm and the dry thickness of the upper magnetic layer is not thicker than 1.5 μm.
8) A magnetic recording medium wherein the coercive force of the upper magnetic layer is from 400 Oe to 2200 Oe and the coercive force of the lower magnetic layer is from 10 times to 0.1 times that of the upper magnetic layer.
9) A magnetic recording medium wherein the crystallite size of the ferromagnetic powder in the lower layer is from 200 to 500 angstroms, and the crystallite size of the ferromagnetic powder in the upper layer is from 150 to 400 angstroms and is smaller than that in the lower layer.

In the second embodiment of this invention, by using a polyurethane resin having a low Tg for the lower magnetic layer (first magnetic layer), the calender processing property is improved and, although a binder having a poor processing property is used for the upper magnetic layer (second magnetic layer), the property of the upper layer is influenced by the flatness of the lower layer since the thickness of the upper layer is thin.

Also, after hardening, the running durability at high temperature and high humidity is improved since a polyurethane resin having high Tg is used for the upper layer. On the other hand, the lower layer has somewhat inferior durability to the upper layer since a polyurethane resin having low Tg is used for the lower layer but the lower layer does not need to have as high a durability as the upper layer. Furthermore, since the lower layer has a low glass transition temperature Tg, the adhesive property of the lower layer and the non-magnetized support is particularly improved.

In the second embodiment of this invention, the dispersibility and the adhesive property of the lower magnetic layer can be improved without changing the ratio of a binder having a high hardness (e.g., a vinyl chloride series copolymer) and a soft binder (e.g., polyurethane), i.e., without lowering the Young's modulus (durability) of the lower magnetic layer.

Suitable polyurethane resins for use in the second embodiment of this invention include the product obtained by reacting a polyol and isocyanate together with, if necessary, a chain elongating agent, etc., such as a polyester polyol, a polyether polyol, a polycarbonate polyol, a polyester polycarbonate, a polyester polyol, a polycaprolactone, etc.

These polyurethane resins have or do not have a yield point depending on the skeleton of the polyester and the concentration of the urethane group. In this invention, it is preferred for the polyurethane resin not to be used alone but to be used as a mixture with other resins, that is, it is used in an amorphous state, regardless of the presence or absence of a yield point.

Also, if desired, a so-called functional group-containing polyurethane resin wherein the polyester, etc., has a functional group such as sulfonic acid, etc., can be used.

The glass transition temperature (Tg) of the polyurethane resin for the first magnetic layer (lower layer) is from $-50°$ C. to $-10°$ C. If the glass transition temperature Tg is less than $-50°$ C., the running durability is poor and if it is over $-10°$ C., the electromagnetic conversion characteristics are poor.

The glass transition temperature (Tg) of the polyurethane resin for the second magnetic layer (upper layer) is from $-20°$ C. to $40°$ C. If the glass transition temperature Tg is less than $-20°$ C., the running durability is poor and if it is over $40°$ C., the electromagnetic conversion characteristics are poor.

Also, if there is a difference of $10°$ C. or higher between the Tg of the polyurethane resin in the lower layer and the Tg of that of the upper layer (i.e., the Tg of the polyurethane resin for the upper layer at least $10°$ C. higher than the Tg of the polyurethane resin for the lower layer), both the running durability and the electromagnetic conversion characteristics are improved and the electromagnetic conversion characteristics are better than those where there is no such a difference.

Examples of polyurethane resins having a glass transition temperature of from $-50°$ C. to $-10°$ C., which can be used for the first magnetic layer, are N-2304 and FR-11 (trade names, made by Nippon Polyurethane K.K.), Crisvon 7209, Pandex 5102S and MB-148 (trade names, made by Dainippon Ink and Chemicals Co., Ltd.).

Examples of polyurethane resins having a glass transition temperature of from $-20°$ C. to $40°$ C., which can be used for the second magnetic layer, are N-2301 and N-5033 (trade names, made by Nippon Polyurethane K.K.), UR-8200, UR-8300, and UR-8600 (trade names, made by Toyobo Co., Ltd.), and CA-118 (trade name, made by Monsanto Chemical Co.).

It is preferred for these polyurethane resins to have a polar functional group. Examples of such a functional group are a hydroxy group, a carboxy group, a sulfonic acid group, a metal sulfonate group, a phosphoric acid group, a phosphoric acid ester group, a metal phosphate group, an epoxy group, an amino group, and a cyano group.

The polyurethane resin for use in the second embodiment of this invention is employed in an amount of at least 5% by weight, and preferably at least 10% by weight, based on the total amount of the entire binder composition of each layer. If the amount of the polyurethane resin is less than 5% by weight, the electromagnetic characteristics are undesirably reduced. Also, if the amount is over 70% by weight, the running durability at high temperature and high humidity is somewhat reduced.

Other binder components which can be used with the polyurethane resin in the second embodiment of this invention are a resin compatible with the polyurethane resin and having a glass transition temperature of at least 50° C. and a hardening agent. Preferred examples of such are a vinyl chloride series copolymer resin, a cellulose series resin, and a polyisocyanate hardening agent.

The vinyl chloride series copolymer resin described above means various copolymers with vinyl chloride as the main component, such as copolymers of vinyl chloride and other monomers such as vinyl acetate, acrylic acid, methacrylic acid, maleic acid, maleic anhydride, vinyl alcohol, etc. Also it is preferred for the vinyl chloride series copolymer resin to have a polar functional group and examples of such a functional group are a hydroxy group, a carboxy group, a sulfonic acid group, a metal sulfonate group, a phosphoric acid group, a phosphoric acid ester group, a metal phosphate group, an epoxy group, an amino group, and a cyano group.

Also, suitable cellulose series resins are nitrocellulose, acetyl cellulose, methylcellulose, ethyl cellulose, cellulose acetate butyrate, cellulose propionate, cellulose acetate propionate, hydroxyethyl cellulose, carboxymethyl cellulose, etc.

It is preferred for the number average molecular weight of the vinyl chloride series copolymer resin or the cellulose series resin for use in the second embodiment of this invention to be from 5,000 to 50,000.

The difference between the weight percent of the vinyl chloride series resin or the cellulose resin in the upper layer to the ferromagnetic powder in the upper layer and the weight percent of the vinyl chloride series copolymer resin or the cellulose series resin in the lower layer to the ferromagnetic powder in the lower layer is preferably within 20%. If the difference is over 20%, the surface property of the double layer is greatly reduced.

Suitable polyisocyanate hardening agents which can be used as a binder component in the second embodiment of this invention are aliphatics and alicyclics each having at least two isocyanate groups; di-, triand tetraisocyanates of aromatics such as benzene, naphthalene, biphenyl, diphenylmethane, triphenylmethane, and addition products thereof.

Specific examples of suitable polyisocyanates are ethanediisocyanate, butane-ω,ω'-diisocyanate, hexane-ω,ω'-diisocyanate, 2,2-dimethylpentane-ω,ω'-diisocyanate, 2,2,4-trimethylpentane-ω,ω'-diisocyanate, decane-ω,ω'-diisocyanate, ω, 107 '-diisocyanate-1,3-dimethylbenzol, ω,ω'-diisocyanate-1,2-dimethylcyclohexane, 1,5-dimethylnaphthalene, 1,3-phenylenediisocyanate, 1-methylbenzol-2,4-diisocyanate, 1,3-dimethylbenzol-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethanediisocyanate, 4,4'-diethoxydiphenylmethane-4,4'-diisocyanate, 1-methylbenzol-2,4,6-triisocyanate, 1,3,5-trimethylbenzol-2,4,6-triisocyanate, diphenylmethane-2,4,6-triisocyanate, triphenylmethane-4,4',4"-triisocyanate, tolylene diisocyanate, etc.; dimers or trimers of these isocyanates; and the addition products of these isocyanates with dihydric or trihydric polyalcohols. Suitable addition products are, for example, the addition products of trimethylolpropane and tolylene diisocyanate or hexamethylene diisocyanate.

Of the aforesaid polyisocyanate hardening agents, those having at least 3 isocyanate groups in one molecule are preferred.

The reason why a magnetic recording medium having excellent electromagnetic conversion characteristics is obtained in the second embodiment of this invention has not yet been clarified but is considered to be as follows.

Since the Tg of the polyurethane resin in the lower layer is lower than the Tg of the polyurethane resin in the upper layer, the processability of the layers using a calender treatment is improved. Also, it is considered that since the Tg of the polyurethane resin in the upper layer is high, the roughness of the surface of the base appear with difficulty on the surface of the magnetic layer at the calender treatment, whereby the electromagnetic characteristics are excellent. Also, it is considered that since the upper magnetic layer becomes hard and the lower magnetic layer becomes soft after calendering, the overall magnetic layer is soft and the surface layer is hard, whereby the magnetic recording medium formed has excellent running durability.

Suitable polyisocyanates for use in the third embodiment of this invention are isocyanates such as tolylene diisocyanate, 4,4'-diphenylmethane diisocyanate, hexamethylene diisocyanate, xililene diisocyanate, naphthylene-1,5-diisocyanate, o-toluidine diisocyanate, isophorone diisocyanate, triphenylmethane triisocyanate, isophorone diisocyanate, etc.; reaction products of the aforesaid isocyanates and polyalcohols; and dimeric to pentadecameric polyisocyanates formed by the condensation of these isocyanates.

The average molecular amount of the polyisocyanate is preferably from 100 to 20,000. These polyisocyanates are commercially available as Coronate L, Coronate HL, Coronate 2030, Coronate 2031, Millionate MR and Millionate MTL (trade names made by Nippon Polyurethane K.K.), Takenate D-102, Takenate D-110N, Takenate D-200, Takenate D-202, Takenate 300S, and Takenate 500 (trade names, made by Takeda Chemical Industries, Ltd.), Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (trade names, made by Sumitomo Bayer Co.). They may be used alone or as a combination thereof by utilizing the difference in hardening reaction.

Also, to accelerate the hardening reaction, a compound having a hydroxy group (e.g., butandiol, hexanediol, a polyurethane having a molecular weight of from 1,000 to 10,000, and water) or an amino group (e.g., monomethylamine, dimethylamine, and trimethylamine) or a metal oxide can be used as a catalyst. The above-described compound having a hydroxy group or an amino group is preferably polyfunctional.

In the third embodiment of this invention, the first magnetic layer contains a polyisocyanate in an amount of from 6 to 15 parts by weight, preferably from 7 to 12 parts by weight, per 100 parts by weight of the ferromagnetic powder in the first magnetic layer; and the second magnetic layer contains a polyisocyanate in an amount of from 3 to 13 parts by weight, preferably from 5 to 10 parts by weight, per 100 parts by weight of the ferromagnetic powder in the second magnetic layer As described above, in the third embodiment of this invention, by defining the thicknesses of the first magnetic layer and the second magnetic layer as described above and properly increasing the degree of cross linking of the binder by incorporating therein the polyisocyanate hardening agent as described above, even when the polyurethane resin used as the binder is hydrolyzed due to a change of, for example, temperature and/or humidity, the low molecular weight products formed by the hydrolysis of the binder are wrapped in the network structure formed by the hardening agent, whereby the occurrence of the difficulty due to clogging of a magnetic head by the low molecular weight urethane deposited on the surface of the magnetic layer. Moreover, since the network structure itself formed by the hardening agent exhibits a proper strength, the magnetic recording medium shows an excellent durability capable of restraining the influence of a change in temperature and humidity as low as possible. Also, by defining the amount of the hardening agent as described above in the third embodiment of this invention, the magnetic layers of the magnetic recording medium can have an appropriate hardness and the magnetic recording medium exhibits an excellent running durability without an increase in dropout and a reduction in output occurring.

Furthermore, in the third embodiment of this invention, the magnetic recording medium has a layer structure such that the amount of the polyisocyanate hardening agent in the first magnetic layer is less than the amount of the hardening agent in the second magnetic layer. As a result, the strength of the magnetic recording medium itself is increased (since the thickness of the first magnetic layer is thicker than the thickness of the second magnetic layer, the strength of the magnetic layer of the magnetic recording medium is determined by the first magnetic layer) and the magnetic recording medium has excellent running durability. Also, since the second magnetic layer which directly contacts the magnetic head is soft, the touch of the magnetic recording medium onto a magnetic head become better and the electromagnetic conversion characteristics are improved.

In the third embodiment of this invention, by employing the above layer structure, a magnetic recording medium having excellent electromagnetic characteristics and excellent durability can be obtained.

There is not particular restriction on the ferromagnetic powder used in this invention. Suitable examples include a ferromagnetic allow fine powder, $\gamma$-$Fe_2O_3$, cobalt-modified $\gamma$-$Fe_2O_3$, $FeP_3O_4$, Co-modified iron oxide, modified barium ferrite, modified strontium ferrite, etc. In this invention, the use of a ferromagnetic alloy powder containing iron, cobalt, or nickel and having a specific surface area of at least 35 $m^2/g$ gives particularly remarkable effects.

Examples of suitable ferromagnetic alloy powders are powders of ferromagnetic alloys wherein the metal content is at least 75% by weight at least 80% by weight of the metal component is at least one ferromagnetic metals (e.g., Fe, Co, and Ni) or alloys (e.g., Fe-Co, Fe-Ni, Co-Ni, and Co-Ni-Fe), and the alloy may further contain other component(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P and iron nitride) in the range of less than 20% by weight of the aforesaid metal component.

Also, the above ferromagnetic metal may contain a small amount of water, a hydride, or an oxide.

In the second embodiment of this invention described hereinbefore, the coercive force of the ferromagnetic powder for the upper magnetic layer is preferably from 350 to 2,500 Oe, and particularly preferably from 400 to 2,200 Oe. It is also preferred for the specific area ($S_{BET}$) thereof to be from 15 $m^2/g$ to 8$m^2/g$, the Crystallite size is to be from 150 to 500 angstroms, and the particle size thereof to be from 0.03 to 0.3 $\mu$m.

If the coercive force of the ferromagnetic substance is less than 350 Oe, the high frequency region characteristics in an audio recording tape at normal position are undesirably inferior and if the coercive force is over 2,500 Oe, the erasure of recordings by an ordinary magnetic head becomes difficult.

Also, it is preferred for the coercive force of the ferromagnetic powder for the lower layer to be same as or lower than the ferromagnetic powder for the upper layer, the specific area of the former to be smaller than that of the latter, and the crystal size of the former to be larger than that of the later.

That is, in an audio recording tape for recording in the lower layer (deep layer), the coercive force of the ferromagnetic powder in the lower layer is preferably from about 1.0 times to 0.5 times that of the ferromagnetic powder in the upper layer and in a video or digital recording tape for recording on the surface layer, recording scarcely occurs on the lower layer and hence the coercive force of the former is preferably from 1.0 times to 0.1 times that of the latter.

When the specific area of the ferromagnetic powder in the lower layer is smaller than that in the lower layer, the magnetic recording medium has excellent print through characteristics and a cost. This is also true as to crystal sizes of the ferromagnetic powder.

In regard to the ferromagnetic powders for use in the third embodiment of this invention, it is preferred for, in particular, video tapes, to use a ferromagnetic powder of a low coercive force for the first magnetic layer and a ferromagnetic powder of a high coercive force for the second magnetic layer, for example, to use cobalt-modified $Fe_2O_3$ having a coercive force lower than 1,000 Oe for the first magnetic layer and cobalt-modified —$Fe_2O_3$ having a coercive force higher than 6,000 Oe for the second magnetic layer, thereby a magnetic recording medium having excellent electromagnetic conversion characteristics can be obtained.

In the first embodiment of this invention, as the binder component which is used together with the vinyl chloride series resin or the cellulose series resin as described hereinbefore, examples include thermosetting resins and reaction type resins. The resin has a molecular weight of less than 200,000 in a coated state as a coating composition but by being heated after coating and drying, the molecular weight becomes almost infinitely large due to condensation or addition reactions. Also, in these resins, a resin which is not softened or melted until the resin is thermally decomposed is preferred.

Specific examples of such a resin are a phenol resin, an epoxy resin, a polyurethane hardening type resin, a urea resin, a melamine resin, an alkyd resin, a silicone resin, an acrylic reactive resin, an epoxypolyamide resin, a nitrocellulose-melamine resin, a mixture of a high molecular weight polyester resin and an isocyanate prepolymer, a mixture of a methacrylate copolymer and a diisocyanate prepolymer, a mixture of a polyester-polyol and a polyisocyanate, a urea-formaldehyde resin, a mixture of a low molecular weight glycol, a high molecular weight diol, and triphenylmethane triisocyanate, a polyamine resin, and mixture thereof.

In the first embodiment of this invention, the entire binders for each magnetic layer are a mixed system of the aforesaid binder alone or a combination of the binders and the aforesaid vinyl chloride series resin or the cellulose series resin. It is preferred that there is a difference in the amount of the vinyl chloride series resin or the cellulose series resin in the entire binders between the first magnetic layer and the second magnetic layer as described above.

The difference in the amount of binder to the ferromagnetic powder between the upper layer and the lower layer is as described hereinbefore but the amount of the binder for the upper layer to the ferromagnetic powder in the same layer is from 10 to 40% by weight, and preferably from 15 to 30% by weight. If the amount thereof i less than 10% by weight, the dispersibility for the ferromagnetic powder is reduced and if the amount is more than 40% by weight, the packing degree of the ferromagnetic powder is undesirably reduced.

In the first embodiment of this invention, known ferromagnetic powder as described above can be used as the ferromagnetic powder in this case, it is preferred that the coercive force of the ferromagnetic powder is from 200 to 2,000 Oe, the specific area thereof is from 15 $m^2/g$ to 80 $m^2/g$, and the crystallite size is from 150 to 500 angstroms. Furthermore, it is also preferred that the coercive force of the ferromagnetic powder in the upper layer is higher than that in the lower layer, the specific surface area of the ferromagnetic powder in the upper layer is larger than that in the lower layer, and the crystallite size of the ferromagnetic powder in the upper layer is smaller than that in the lower layer.

In this invention, the magnetic layer may further contain known non-magnetic powders such as carbon black, abrasives, etc., in addition to the ferromagnetic powder.

In this invention, the dry thickness of the upper magnetic layer is preferably 1.5 μm or less, more preferably 1 μm or less, and most preferably 0.5 μm or less.

In this invention, the dry thickness of the lower magnetic layer is preferably thicker than 2.0 μm, and is more preferably thicker than 2.5 μm. If the thickness of the lower layer less than 2.0 μm, the electromagnetic conversion characteristics are not improved due to, perhaps, the inferiority of the processability during calendering.

In the third embodiment of this invention, examples of binders for the magnetic layer and, if desired, back layers are thermoplastic resins, thermosetting resins, reaction type resins, and mixtures thereof.

The thermoplastic resins for use in the third embodiment have a softening point of not higher than 150° C, an average molecular weight of from 10,000 to 300,000, and a polymerization degree of from 50 to 2,000. Examples of suitable resins are a vinyl chloride-vinyl acetate copolymer, a vinylchloride copolymer, a vinyl chloride-vinylidene chloride copolymer, a vinyl chloride-acrylonitrile copolymer, an acrylic acid ester-vinylidene chloride copolymer, an acrylic acid ester-styrene copolymer, a methacrylic acid ester-acrylonitrile copolymer, a methacrylic acid estervinylidene chloride copolymer, a methacrylic acid esterstyrene copolymer, a urethane elastomer, a nylon-silicon series resin, a nitrocellulose-polyamide resin, polyvinylfluoride, a vinylidene chloride-acrylonitrile copolymer, a butadiene-acrylonitrile copolymer, a polyamide resin, polyvinylbutyral, cellulose derivatives (e.g., cellulose acetate butyrate, cellulose diacetate, cellulose triacetate, cellulose propionate, nitrocellulose, ethyl cellulose, methyl cellulose, propyl cellulose, methylethyl cellulose, carboxymethyl cellulose, acetyl cellulose, etc.), a styrene-butadiene copolymer, a polyester resin, a chlorovinyl etheracrylic acid ester copolymer, an amino resin, various synthetic rubber series thermoplastic resins, and mixtures of them.

The thermosetting resin or the reaction type resin has a molecular weight of less than 200,000 in the state of the coating composition but upon being heated after coating and drying, the molecular weight becomes infinite by condensation or addition reactions. Also, in these resins, those which are not softened or melted until they are thermally decomposed are preferred. Specific examples of suitable resins are a phenol resin, a phenoxy resin, an epoxy resin, a polyurethane hardening type resin, a urea resin, a melamine resin, an alkyd resin, a silicon resin, an acrylic series reactive resin, an epoxy-polyamide resin, a nitrocellulosemelamine resin, a mixture of a high molecular weight polyester resin and an isocyanate prepolymer, a mixture of a methacrylate copolymer and a diisocyanate prepolymer, a mixture of polyester polyol and polyisocyanate, a urea-formaldehyde resin, a mixture of a low molecular weight glycol/high molecular weight diol/triphenylmethane triisocyanate, a polyamine resin, and mixtures of them.

These binders can be used alone or as a combination thereof together with, if necessary, other additives. The mixing ratio of the binder and the ferromagnetic powder in the magnetic layer is from 5 to 300 parts by weight for the binder to 100 parts by weight of the ferromagnetic powder.

These thermoplastic resin, thermosetting resin, and reaction type resin can have, in addition to the main functional group, a carboxylic acid group, a sulfinic acid group, a sulfenic acid group, a sulfonic acid group, a phosphoric acid group, a sulfuric acid group, a phosphone group, a phosphine group, a boric acid group, a sulfuric acid ester group, a phosphoric acid ester group, the alkyl esters thereof (these acid groups may be in the forms of the Na salt, etc.), an amino acid group, an aminofulfonic acid group, an amino alcohol sulfuric acid ester group, an amino alcohol phosphoric acid ester group, an amphoteric group such as an alkylbetaine type group, etc., an amino group, an imino group, an imido group, an amide group, an epoxy group, a hydroxy group, an alkoxy group, a thiol group, a halogen group, a silyl group, or a siloxane group as a functional group.

The resin contains usually 1 to 6 kinds of such functional groups and the content of each functional group is preferably from $1 \times 10^{-6}$ eq. to $1 \times 10^{-2}$ eq. per gram of the resin.

In this invention, each magnetic layer can further contain various additives known in the field and suitable examples of such additives are dispersing agent such as various surface active agents, fatty acids, fatty acid salts, amides, etc.; lubricants such as carbon black, etc.; abrasives such as alumina, etc.

The magnetic layer can be formed by coating the magnetic coating compositions prepared using the above-described materials on a non-magnetic support by the following method.

First, a coating composition for a first magnetic layer is prepared by kneading the resin components and the ferromagnetic powder for the first magnetic layer (lower layer) together with a solvent and, if necessary, other components such as a curing agent, etc. Also, a coating composition for a second magnetic layer (upper layer) is prepared using the components for the second magnetic layer in the same way as above.

The magnetic recording medium of this invention is produced by, for example, coating the coating composition for the first magnetic layer on the surface of a non-magnetic support while running and then the coating composition for the second magnetic layer is continuously coated on the coated layer while the coated layer is in a wet condition at a dry thickness of from 0.03 to 1.5 μm, and preferably from 0.1 to 1.0 μm.

For continuous coating of the two layers, in using extrusion coaters as a coating machine, two extrusion coaters are disposed in succession along the non-magnetic support while running followed by coating, or two extrusion coaters are disposed with an interval between them such that the coated first magnetic layer retains the wet condition (i.e., a condition that the coated layer still contains a solvent and is adhesive) followed by coating.

Examples of coating machines for coating the above magnetic coating compositions include an air doctor-coater, a blade coater, a rod coater, an extrusion coater, an air knife coater, a squeeze coater, a dip coater, a reverse roll coater, a transfer roll coater, a gravure coater, a kiss coater, a cast coater, a spray coater, a spin coater, etc. In this invention, an extrusion coater for simultaneous double coating having two slots as described in Japanese Patent Application 62-124631 is particularly preferred.

Even when the second magnetic layer (upper layer) thus formed is a very thin magnetic layer having a thickness of from 0.03 to 1.5 μm, the layer can be coated at a uniform thickness and with a very smooth surface. Thus, a magnetic recording medium having excellent running durability can be produced without reducing the electromagnetic conversion characteristics.

The aforesaid coating compositions are coated such that the thickness of the magnetic layer (the total thickness of the thickness of the first magnetic layer magnetic recording layer is usually in the range of from 2.5 to 10 μm.

In this invention, a backing layer may be formed on a surface of the non-magnetic support opposite to the surface carrying the magnetic layer. Usually, the backing layer is formed by coating a coating composition for a backing layer comprising a kneaded mixture of a binder, an abrasive, an antistatic agent, and an organic solvent together with, if necessary, a lubricant, etc., on the back surface of the non-magnetic support.

In addition, an adhesive layer may be formed between the non-magnetic support and the magnetic layer and/or the backing layer.

Usually, the coated magnetic layer is subjected to a magnetic orientation treatment, i.e., a treatment of orienting the ferromagnetic powder present in the coated layers and then dried.

Suitable organic solvent which can be used for dispersing, kneading, and coating the coating compositions in this invention are ketones such as acetone, methyl ethyl ketone, methyl isobutyl ketone, cyclohexanone, isophorone, tetrahydrofuran, etc.; alcohols such as methanol, ethanol, propanol, butanol, isobutyl alcohol, isopropyl alcohol, methyl cyclohexanol, etc.; esters such as methylacetate, ethyl acetate, butyl acetate, isobutyl acetate, isopropyl acetate, ethyl lactate, acetic acid glycol monoethyl ether, etc.; ethers such as methyl acetate, ethyl acetate, butyl acetate, isobutyl acetate, isopropyl acetate, ethyl lactate, acetic acid glycol monoethyl ether, etc.; ethers such as diethyl ether, tetrahydrofuran, glycol dimethyl ether, glycol monoethyl ether, dioxane, etc.; taric aromatic hydrocarbons such as benzene, toluene, xylene, cresol, chlorobenzene, styrene, etc.; chlorinated hydrocarbons such as methylene chloride, ethylene chloride, carbon tetrachloride, chloroform, ethylene chlorohydrin, dichlorobenzene, etc.; N,N-dimethylformamide, hexane, etc. These organic solvents can be used alone or as a mixture thereof at an optional ratio.

When, the magnetic recording medium of this invention is a magnetic recording tape, the thickness of the support is from about 2.5 to 100 μm, and preferably is from about 3 to 70 μm. When the magnetic recording medium is a magnetic recording disk or card, the thickness is from about 0.03 to 10 mm. When the support is a drum, a cylindrical drum can be used.

Suitable materials for the support include polyesters such as polyethylene terephthalate, polyethylene naphthalate, etc.; polyolefins such as polypropylene, polyethylene, etc.; cellulose derivatives such as cellulose acetate, cellulose diacetate, etc.; vinylic resins such as polyvinyl chloride, polyvinylidene chloride, etc.; other plastics such as polycarbonate, polyamide, polysulfone, etc.; metals such as copper, etc.; and ceramics such as glass, etc., can be used.

The support may be subjected to a corona discharging treatment, a plasma treatment, a subbing treatment, a heat treatment, a dust-removing treatment, a metal vapor depositing treatment, or an alkali treatment prior to coating.

Suitable supports are those described in West German Patent 3,338,854A, JP-A-59-116926, U.S. Pat. No. 4,388,368, and Yukio Mitsuishi, *Sen'i to Kogyo* (*Fibers and Industry*), Vol. 31, 50–55 (1975).

In this invention, as a method of coating the above two kinds of magnetic coating compositions on the support by a wet one wet system, the simultaneous or successive double layer coating system described in Japanese Patent Application 62-124631 can also be used.

The magnetic layer coated on the support by the above method is, if desired, subjected to a treatment of orienting the ferromagnetic powder in the layer in a desired direction while immediately drying the layer. In this case, the travelling speed of the support is usually from 10 m/min. to 1,000 m/min. and the drying temperature is from 20° C. to 130° C. Also, if necessary, the magnetic recording medium is subjected to a surface smoothening treatment and cut into a desired form to provide the magnetic recording medium of this invention.

In the production process, it is preferred to continuously carry out the steps of surface treatment of fillers, kneading, dispersing, coating, heat-treatment, calendering, EB (electron beam) treatment, surface polishing treatment, and cutting. If necessary, these steps can be conducted as several steps.

In these steps, the temperature and humidity are controlled. That is, the temperature is from 10° C. to 130°

C. and the humidity is from 5 mg/m² to 20 mg/m² as the content of water in air. These conditions are shown In JP-B-40-23625 and JP-39-26368 (the term "JP-B" as used herein means an "examined published Japanese patent application" and U.S. Pat. No. 3,473,960. Also, the method described in JP-B-41-13181 is a fundamental and important technique in the field of the art, and such can be employed for producing the magnetic recording medium of this invention.

For the surface smoothening treatment, super calender rolls, etc., are utilized. By applying the surface smoothening treatment, voids formed by the removal of the solvent at drying are eliminated and the packing ratio of the ferromagnetic powder in the magnetic layer is improved, thereby a magnetic recording medium having high electromagnetic conversion characteristics can be obtained.

Cutting of the magnetic recording medium can be performed using an ordinary cutter such as a slitter, etc., under conventional conditions.

The magnetic recording medium of this invention described above in detail is of a two-layer (upper layer and lower layer) system but the magnetic recording medium may have three or more layers if these layers include the above two magnetic layers having the above-defined properties.

The invention is further described by the following examples. It can, however, be easily understood that the components, component ratios, order of the operation steps, etc., shown below can be changed within the scope of this invention.

Thus, the invention is not limited to the following examples. In addition, all parts in the examples are by weight.

| First Magnetic Layer: | |
|---|---|
| Cobalt-modified iron oxide (Hc 680 Oe, $S_{BET}$ 30 m²/g, crystal size 400 Å) | 100 parts |
| Vinyl chloride-vinyl acetate-maleic anhydride copolymer (composition ratio: 86:13:1, polymerization degree: 400) | 10 parts |
| Polyester polyurethane resin | 5 parts |
| Carbon black (particle size: 0.05 μm) | 3 parts |
| Butyl stearate | 1 part |
| Stearic acid | 2 parts |
| Butyl acetate | 200 parts |
| Second Magnetic Layer: | |
| Cobalt-modified iron oxide (Hc 700 Oe, $S_{BET}$ 35 m²/g, crystal size 350 Å) | 100 parts |
| Vinyl chloride-vinyl acetate-maleic anhydride copolymer (composition ratio: 86:13:1, polymerization degree: 400) | 12 parts |
| Polyester polyurethane resin | 6 parts |
| Carbon black (particle size: 0.05 μm) | 3 parts |
| α-Alumina (particle size 0.3 μm) | 3 parts |
| Butyl stearate | 1 part |
| Stearic acid | 2 parts |
| Butyl acetate | 200 parts |

Each of the above two coating compositions, were dispersed by kneading using a sand mill. Then, 5 parts of polyisocyanate was added to the dispersion for the first layer and 6 parts of polyisocyanate was added to the dispersion for the second layer, and further 40 parts of butyl acetate was added to each dispersion. Then, each dispersion was filtered using a filter having a mean pore size of 1 μm to provide a coating composition for the first magnetic layer and a coating composition for the second magnetic layer.

The coating composition for the first magnetic layer was coated on a polyethylene terephthalate support of a thickness of 15 μm at a dry thickness of 3.0 μm and directly thereafter, the coating composition for the second magnetic layer was coated thereon by a simultaneous coating method at a dry thickness of 0.7 μm, the coated magnetic layers were oriented by a cobalt magnet and solenoid while both layers were in wet conditions, dried, and treated with super calender. The coated film was cut into ½ inch in width to provide a Video Tape A-1.

EXAMPLE 2

By following the same procedure as in Example 1 except that the amount of the vinyl chloride-vinyl acetate-maleic anhydride copolymer and the amount of the total of the binders were changed as shown in Table 1 below, Video Tapes A-2 to A-8 were prepared.

EXAMPLE 3

By following the same procedure as in Example 1 except that nitrocellulose was used in place of the vinyl chloride-vinyl acetate-maleic anhydride copolymer, Video Tape A-9 was prepared.

COMPARISON EXAMPLE 1

By following the same procedure as in Example 1 except that the amount of the vinyl chloride-vinyl acetate-maleic anhydride copolymer and the amount of the total of binder for the first layer were changed to those for the second layer, Video Tape B-1 was prepared.

COMPARISON EXAMPLE 2

By following the same procedure as in Example 1 except that the amount of the vinyl chloride-vinyl acetate-maleic anhydride copolymer and the amount of the total binders in the first layer were changed as shown in Table 1 below, Video Tapes B-2, B-3, B-4, and B-5 were prepared.

COMPARISON EXAMPLE 3

By following the same procedure as in Example 1 except that the amount of nitrocellulose and the amount of the total binders in the first layer were changed to those in the second layer, Video Tape B-6 was obtained.

COMPARISON EXAMPLE 4

By following the same procedure as in Comparison Example 1 except that the thickness of the upper layer was changed to 2.0 μm, Video Tape B-7 was prepared.

The results obtained on measuring various properties of the samples thus obtained are shown in Table 1 below.

TABLE 1

| First Magnetic Layer | | | Second Magnetic Layer | | |
|---|---|---|---|---|---|
| All Binders Amount A | Vinyl-Chloride Resin Amount B | Nitrocellulose Amount B | All Binders Amount C | Vinyl Chloride Resin Amount D | Nitrocellulose Amount D |

TABLE 1-continued

| Sample | (part) | (part) | (part) | (part) | (part) | (part) |
| --- | --- | --- | --- | --- | --- | --- |
| Comp. B-2 Ex. 2 | 10 | 5 | — | 24 | 12 | — |
| Comp. B-3 Ex. 2 | 18 | 9 | — | 24 | 12 | — |
| Ex. 2 A-2 | 20 | 8 | — | 24 | 12 | — |
| Ex. 1 A-1 | 20 | 10 | — | 24 | 12 | — |
| Ex. 2 A-3 | 20 | 12 | — | 24 | 12 | — |
| Ex. 2 A-4 | 20 | 16 | — | 24 | 12 | — |
| Ex. 2 A-5 | 22 | 11 | — | 24 | 12 | — |
| Comp. B-1 Ex. 1 | 24 | 12 | — | 24 | 12 | — |
| Comp. B-7 Ex. 4 | 24 | 12 | — | 24 | 12 | — |
| Ex. 2 A-6 | 26 | 13 | — | 24 | 12 | — |
| Ex. 2 A-7 | 28 | 12 | — | 24 | 12 | — |
| Ex. 2 A-8 | 28 | 14 | — | 24 | 12 | — |
| Comp. B-4 Ex. 2 | 30 | 15 | — | 24 | 12 | — |
| Comp B-5 Ex. 2 | 38 | 19 | — | 24 | 12 | — |
| Ex. 3 A-9 | 20 | — | 10 | 24 | — | 12 |
| Comp. B-6 Ex. 3 | 24 | — | 12 | 24 | — | 12 |

| Sample | A/C-I (%) | B/D-I (%) | Thickness of Second Layer ($\mu$m) | Surface Roughness after Coating (nm) | Surface Roughness after Calendering (nm) | Y.S/N (dB) | C.S/N (dB) |
| --- | --- | --- | --- | --- | --- | --- | --- |
| Comp. B-2 Ex. 2 | −58.3 | −58.3 | 0.7 | 16.5 | 11.8 | −0.9 | −1.1 |
| Comp. B-3 Ex. 2 | −25.0 | −25.0 | 0.7 | 15.2 | 9.2 | −0.2 | −0.2 |
| Ex. 2 A-2 | −16.7 | −33.3 | 0.7 | 14.0 | 7.8 | 0.8 | 0.6 |
| Ex. 1 A-1 | −16.7 | −16.7 | 0.7 | 12.5 | 6.0 | 1.5 | 1.4 |
| Ex. 2 A-3 | −16.7 | 0.0 | 0.7 | 11.8 | 6.8 | 1.4 | 1.3 |
| Ex. 2 A-4 | −16.7 | 33.3 | 0.7 | 13.4 | 7.4 | 0.5 | 0.7 |
| Ex. 2 A-5 | −8.3 | −8.3 | 0.7 | 14.0 | 7.5 | 0.6 | 0.6 |
| Comp. B-1 Ex. 1 | 0.0 | 0.0 | 0.7 | 15.0 | 8.8 | 0.0 | 0.0 |
| Comp. B-7 Ex. 4 | 0.0 | 0.0 | 0.7 | 16.8 | 9.3 | −0.2 | −0.3 |
| Ex. 2 A-6 | 8.3 | 8.3 | 0.7 | 16.0 | 8.0 | 0.6 | 0.5 |
| Ex. 2 A-7 | 16.7 | 0.0 | 0.7 | 16.0 | 7.0 | 1.2 | 1.2 |
| Ex. 2 A-8 | 16.7 | 16.7 | 0.7 | 16.4 | 6.8 | 1.3 | 1.3 |
| Comp. B-4 Ex. 2 | 25.0 | 25.0 | 0.7 | 18.8 | 8.2 | 0.2 | 0.2 |
| Comp B-5 Ex. 2 | 58.3 | 58.3 | 0.7 | 24.7 | 11.2 | −0.8 | −1.1 |
| Ex. 3 A-9 | −16.7 | −16.7 | 0.7 | 10.7 | 6.8 | 1.1 | 1.2 |
| Comp. B-6 Ex. 3 | 0.0 | 0.0 | 0.7 | 14.4 | 9.1 | −0.2 | −0.3 |

In addition, in the evaluations shown in the above table, surface roughness was evaluated by a contact stylus type surface roughness meter (Surfcom Type 800A, trade name, made by Tokyo Seimitsu K.K.) and Y.S/N (S/N at the high frequency region) and C.S/N (C/N at the low frequency region) were measured as follows.

Measurement Method

Y.S/N

A luminance signal of 4 MHz was recorded on the video tape obtained using a VHS video tape recorder (NV-8200, trade name, made by Matsushita Electric Industrial Co., Ltd.) and the difference between the S/N of a standard tape (the video tape obtained in Comparison Example 1) and the S/N of each video tape was determined.

C.S/N

A color signal of 4MHz was recorded on the video tape using the above VHS video tape recorder and the difference between the S/N of the standard tape (the video tape obtained in Comparison Example 1) and the S/N of each sample was determined.

As is clear from the results shown in Table 1 above, it can be seen that the magnetic recording tapes wherein the ratio of the total binders to the ferromagnetic powder in each of the first magnetic layer and the second magnetic layer was as defined in the first embodiment of this invention have excellent Y.S/N and C.S/N. In particular, the magnetic recording tapes wherein the ratio of the vinyl chloride series resin or the cellulose series resin was as defined in the preferred embodiment of this invention have even more excellent Y.S/N and C.S/N.

EXAMPLE 4

| First Magnetic Layer (lower layer): | |
| --- | --- |
| Cobalt-modified iron oxide (Hc 680 Oe, $S_{BET}$ 30 m$^2$/g, crystallite size: 250 Å, particle size 0.25 $\mu$m) | 100 parts |
| Vinyl chloride-vinyl acetate-maleic anhydride copolymer (composition | 5 parts |

-continued

| | |
|---|---|
| ratio: 86:13:1, polymerization degree: 400) | |
| Polyester polyurethane resin (glass transition temp. shown in Table 2) | 3 parts |
| Carbon black (particle size: 0.05 μm) | 3 parts |
| Butyl stearate | 1 part |
| Stearic acid | 2 parts |
| Butyl acetate | 200 parts |
| Second Magnetic Layer (upper layer): | |
| Cobalt-modified iron oxide (Hc 700 Oe, $S_{BET}$ 35 m²/g, crystallite size 200 Å particle size 0.20 μm) | 100 parts |
| Vinyl chloride-vinyl acetate-maleic anhydride copolymer (composition ratio: 86:13:1, polymerization degree: 400) | 12 parts |
| Polyester polyurethane resin (glass transition temp. shown in Table 2) | 6 parts |
| Carbon black (particle size: 0.05 μm) | 3 parts |
| α-Alumina (particle size 0.3 μm) | 3 parts |
| Butyl stearate | 1 part |
| Stearic acid | 2 parts |
| Butyl acetate | 200 parts |

Each of the above two coating compositions, were dispersed by kneading using a sand mill. Then, 5 parts of polyisocyanate (Coronate L-75, trade name, made by Nippon Polyurethane K.K.) was added to the dispersion for the first magnetic layer and 6 parts of the polyisocyanate was added to the dispersion for the second magnetic layer, and further 40 parts of butyl acetate was added to each dispersion. Then, each dispersion was filtered using a filter having a mean pore size of 1 μm to provide a coating composition for the first magnetic layer and a coating composition for the second magnetic layer.

The coating composition for the first magnetic layer was coated on a polyethylene terephthalate support of a thickness of 15 μm at a dry thickness of 3.0 or 2.0 μm and directly thereafter, the coating composition for the second magnetic layer was coated thereon at a dry thickness of 0.5, 0.7, or 1.5 μm by a simultaneous double layer coating method, the coated magnetic layers were oriented using a cobalt magnet and solenoid while the coated layers were in wet conditions, dried, supercalendered, and the coated film was cut into a width of ½ inch to provide video tapes (Sample Nos. 1 to 17).

The properties of these samples are shown in Table 2 below. Sample No. 12 has a single layer (one magnetic layer, or upper layer only).

EXAMPLE 5

By following the same procedure as in Example 4 except that nitrocellulose was used in place of the vinyl chloride-vinyl acetate-maleic anhydride copolymer, sample No. 18 was prepared.

COMPARISON EXAMPLE 5

By following the same procedure as in Example 4 except that the amount of the vinyl chloride-vinyl acetate-maleic anhydride copolymer in the first magnetic layer (lower layer) was changed to 5 parts from 10 parts and the amount of the polyester polyurethane resin was changed to 10 parts from 5 parts, Sample No. 19 was prepared.

The results obtained are shown in Table 2.

TABLE 2

| | Layer Structure | | | | Evaluation Results | | | | | |
|---|---|---|---|---|---|---|---|---|---|---|
| Sample No. | Lower Layer Urethane Tg (°C.) | Upper Layer Urethane Tg (°C.) | Lower Layer Thickness (μm) | Upper Layer Thickness (μm) | Video Sensitivity (dB) | Y-S/N (dB) | Croma Output (dB) | C-S/N (dB) | Running Still Life (min.) | Durability |
| 1* | −60 | 20 | 3.0 | 0.7 | 2.7 | 2.5 | 2.6 | 1.6 | 110 | B |
| 2* | −50 | " | " | " | 2.6 | 2.4 | 2.4 | 1.4 | >120 | A |
| 3* | −40 | " | " | " | 2.5 | 2.3 | 2.2 | 1.1 | " | A |
| 4* | −30 | " | " | " | 2.4 | 2.2 | 2.2 | 1.1 | " | A |
| 5* | −20 | " | " | " | 2.2 | 2.0 | 2.0 | 1.0 | " | A |
| 6* | −10 | " | " | " | 2.0 | 1.8 | 1.8 | 0.8 | " | A |
| 7 | 0 | " | " | " | 1.8 | 1.6 | 1.6 | 0.5 | " | A |
| 8 | −30 | −30 | " | " | 2.4 | 1.8 | 2.2 | 0.8 | 90 | B |
| 9* | " | −20 | " | " | 2.4 | 2.0 | 2.2 | 1.0 | >120 | A |
| 10* | " | −10 | " | " | 2.4 | 2.0 | 2.2 | 1.0 | " | A |
| 11* | " | 0 | " | " | 2.4 | 2.2 | 2.2 | 1.1 | " | A |
| 12 | — | 20 | — | 3.7 | 1.7 | 1.8 | 0.9 | 1.0 | " | A |
| 13* | " | 40 | " | " | 2.2 | 2.0 | 2.1 | 1.0 | " | A |
| 14 | " | 50 | " | " | 2.0 | 1.9 | 2.0 | 1.0 | " | A |
| 15* | " | 20 | " | 0.5 | 2.4 | 2.3 | 2.0 | 1.2 | " | A |
| 16* | " | " | " | 1.5 | 2.2 | 1.8 | 2.0 | 0.8 | " | A |
| 17* | " | " | 2.0 | 0.7 | 1.8 | 1.8 | 1.6 | 0.7 | " | A |
| 18* | " | " | 3.0 | 0.7 | 2.4 | 2.3 | 2.0 | 1.2 | " | A |
| 19 | " | −30 | " | " | 1.8 | 1.5 | 1.6 | 0.7 | 100 | B |

*The Samples of the invention

The evaluations shown in the above table were performed as follows.

(1) Video Sensitivity

Output of 4.2 MHz using a VHS type video deck. A relative value when SAG tape made by Fuji Photo Film Co., Ltd. was defined as 0 dB. The measuring device was AG-3700, trade name, made by Matsushita Electric Industrial Co., Ltd. Hereinafter, the SAG tape was a standard tape. The measuring device was the same.

(2) Y.S/N

S/N of a visually corrected luminance signal. Relative value.

(3) Chroma Output

Video output at 629 KHz. Relative value.

(4) C.S/N

S/N of a visually corrected color signal. Relative value.

(5) Still Life

A signal recorded was reproduced in a still mode and the time until the S/N reduced to 6 dB. (min.)

(6) Runninq Durability

Occurrence of difficult when each sample was run at 100 passes by 40 decks.

A: Neither a reduction in output of more than 3 dB nor an increase of dropout and jitter occurred.

B: A reduction of output of more than 5 dB did not occur but an increase of dropout and jitter was observed to some extent.

As shown in Table 2, it can be seen that Sample No. 1 wherein the Tg of the polyurethane resin in the lower layer was low as $-60°$ C. shows excellent electromagnetic conversion characteristics but shows some difficulties in still life and running durability.

Also, it can be seen that Sample No. 7 wherein the Tg of the polyurethane resin in the lower layer was as high as $0°$ C. is slightly inferior in electromagnetic conversion characteristics.

EXAMPLE 6

| Second Magnetic Layer: | |
|---|---|
| Co-γ-Fe$_2$O$_3$(Hc 700 Oe, S$_{BET}$40 m$^2$/g) | 100 parts |
| Vinyl chloride-vinyl acetate-maleic anhydride copolymer (composition ratio 86:13:1, polymerization degree, 400) | 12 parts |
| Polyester polyurethane (average molecular weight 20,000) | 9 parts |
| Carbon black (particle size: 0.02 μm) | 10 parts |
| α-Al$_2$O$_3$ (mean particle size 0.2 μm) | 40 parts |
| Oleic acid | 1 part |
| Butyl acetate | 200 parts |
| First Magnetic Layer: | |
| Co-γ-Fe$_2$O$_3$(Hc 650 Oe, S$_{BET}$25 m$^2$/g) | 100 parts |
| Vinyl chloride-vinyl acetate-maleic anhydride copolymer (composition ratio: 86:13:1, polymerization degree: 400) | 12 parts |
| Polyester polyurethane (average molecular weight 20,000) | 9 parts |
| Carbon black (particle size: 0.03 μm) | 5 parts |
| Oleic acid | 1 part |
| Butyl acetate | 200 parts |

Each of the above two coating compositions, were dispersed by kneading using a sand mill. Then, a polyisocyanate (amount as shown in Table 3 below) and butyl acetate were added to the dispersion for the first magnetic layer and a polyisocyanate (amount as shown in Table 3) and 40 parts of butyl acetate were added to the dispersion for the second magnetic layer. Each dispersion was filtered using a filter having a mean pore size of 1 μm to provide the coating composition for the first magnetic layer and the coating composition for the second magnetic layer.

Coating of the coating composition for the first magnetic layer and the coating composition for the second coating layer was performed as follows using a simultaneous double layer extrusion coater having a slot for the coating composition for the first magnetic layer and a slot for the coating composition for the second magnetic layer.

The coating composition for the first magnetic layer was coated on a polyethylene terephthalate support of a thickness of 14 μm at a dry thickness as shown in Table 3 while running the support at a speed of 60m/min. using the above extrusion coater and directly thereafter (while the coated layer was in a wet condition), the coating composition for the second magnetic layer was simultaneously coated thereon at a dry thickness shown in Table 3 below, the magnetic layers were oriented using a magnet while the coated layers were in wet conditions, dried, super-calendered, and cut into a width of ½ inch to provide a video tape.

These tapes thus prepared were evaluated as follows.

Measurement Method

(1) Y.S/N

A luminous signal of 4 MHz was recorded on the video tape using a VHS video tape recorder (NV-8200, trade name, made by Matsushita Electric Industrial Co.) and the difference between the S/N of a standard tape (the tape obtained in Comparison Example 1 and the S/N of each sample was determined.

(2) C.S/N

A color signal of 4 MHz was recorded on the video tape obtained using the above VHS video tape recorder and the difference in S/N was determined using the tape obtained in Comparison Example 1 as a standard tape.

(3) Dropout Increase

The number of dropout which occurred in one minute was measured using the above VHS video tape recorder.

(4) Storage Stability

After placing the video tape obtained in an atmosphere of $50°$ C., 70% RH for 10 days, the tape was run for 120 minutes using the above VHS video tape recorder and the deviation of the output during running was determined. The evaluation was performed as follows.

A: No reduction in output was observed.

B and C: Abrupt reduction in output was observed (C was worst).

(5) Total Evaluation

A: Totally excellent
C: Poor

The results obtained are shown in Table 4 below.

TABLE 3

| | Amount of Isocyanate | | Thickness | |
|---|---|---|---|---|
| Sample No. | First Magenta Layer (%) | Second Magenta Layer (%) | First Magenta Layer (μm) | Second Magenta Layer (μm) |
| 21 | 6 | 3 | 3.5 | 0.5 |
| 22 | 10 | 3 | 3.5 | 0.5 |
| 23 | 15 | 3 | 3.5 | 0.5 |
| 24 | 10 | 8 | 3.5 | 0.5 |
| 25 | 15 | 8 | 3.5 | 0.5 |
| 26 | 15 | 13 | 3.5 | 0.5 |
| 27 | 10 | 8 | 3.5 | 0.5 |
| 28 | 10 | 8 | 5.0 | 0.3 |
| 29 | 10 | 8 | 5.0 | 1.5 |
| 30 | 10 | 8 | 2.5 | 1.5 |
| 31 | 6 | 13 | 3.5 | 0.5 |
| 32 | 10 | 8 | 2.5 | 0.2 |

TABLE 3-continued

| | Amount of Isocyanate | | Thickness | |
|---|---|---|---|---|
| Sample No. | First Magenta Layer (%) | Second Magenta Layer (%) | First Magenta Layer (μm) | Second Magenta Layer (μm) |
| 33 | 10 | 8 | 1.5 | 1.0 |

Sample 21 to 30: Samples of the Invention
Sample 31 to 33: Comparison Samples

TABLE 4

| Sample No. | Y.S/N (dB) | C.S/N (dB) | DO Increase | Storage Stability | Total Evaluation |
|---|---|---|---|---|---|
| 21 | 2.3 | 1.2 | none | A | A |
| 22 | 2.2 | 1.2 | " | A | A |
| 23 | 2.0 | 1.3 | " | A | A |
| 24 | 2.1 | 1.1 | " | A | A |
| 25 | 2.0 | 1.0 | " | A | A |
| 26 | 2.0 | 1.2 | " | A | A |
| 27 | 1.9 | 1.1 | " | A | A |
| 28 | 1.8 | 1.0 | " | A | A |
| 29 | 2.3 | 1.0 | " | A | A |
| 30 | 2.2 | 1.1 | " | A | A |
| 31 | 1.9 | 1.1 | 6 | C | C |
| 32 | 1.4 | 1.0 | 2 | B | C |
| 33 | 2.0 | 1.1 | 20 | B | C |

Sample 21 to 30: Samples of the Invention
Sample 31 to 33: Comparison Samples

As is clear from the results in Table 4, it can be seen that the magnetic recording tapes wherein the thickness of each magnetic layer and the amount of a hardening agent in each magnetic layer were defined as in the third embodiment of this invention have excellent Y.S/N, C.S/N, running durability, and storage stability as well as have excellent electromagnetic conversion characteristics and durability.

On the other hand, it can be seen that the magnetic recording tape containing a reduced amount of isocyanate in the first magnetic layer has inferior storage stability the magnetic recording tape having a thin thickness of the second magnetic layer has inferior electromagnetic conversion characteristics, and the magnetic recording medium having a thick second magnetic layer has the hard magnetic layer, whereby the surface is scratched on contact with a magnetic head causing a reduction in output.

As described above, this invention provides a magnetic-recording medium having excellent electromagnetic conversion characteristics and running durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a first magnetic layer and a second magnetic layer in this order, wherein said second magnetic layer is coated on said first magnetic layer while said first magnetic layer is in a wet condition, wherein said first magnetic layer and said second magnetic layer contain a vinyl chloride resin or a cellulose resin as a part of the binder; the amount (A) of the total of the binders for the first magnetic layer to the ferromagnetic powder for the first magnetic layer and the amount (C) of the total of the binders for the second magnetic layer to the ferromagnetic powder for the second magnetic layer have the relationship $(A/C-1) \times 100$ of from $-20\%$ to $-5\%$ or from $+5\%$ to $+20\%$; the amount (B) of the vinyl chloride resin or the cellulose resin in the total of the binders of the first magnetic layer to the ferromagnetic powder in the first magnetic layer and the amount (D) of the vinyl chloride resin or the cellulose resin in the total of the binders of the second magnetic layer to the ferromagnetic powder in the second magnetic layer have the relationship of $(B/D-1) \times 100$ of from $-20\%$ to $+20\%$.

2. A magnetic recording medium as claimed in claim 1, wherein said vinyl chloride resin is a copolymer of vinyl chloride and one or more additional monomers selected from the group consisting of vinyl acetate, acrylic acid, maleic acid, maleic anhydride, methacrylic acid and vinyl alcohol.

3. A magnetic recording medium as claimed in claim 2, wherein the copolymer has at least one polar functional group.

4. A magnetic recording medium as claimed in claim 1, wherein said cellulose resin is nitrocellulose, acetyl cellulose, methyl cellulose, ethyl cellulose, cellulose acetate butylate, cellulose propionate, cellulose acetate propionate, hydroxyethyl cellulose or carboxymethyl cellulose.

5. A magnetic recording medium comprising a nonmagnetic support having thereon double magnetic layers each containing a ferromagnetic powder dispersed in a binder, wherein the lower magnetic layer contains at least one kind of polyurethane resin having a glass transition temperature of from $-50°$ C. to $-10°$ C. as the binder, the upper magnetic layer contains at least one kind of polyurethane resin having a glass transition temperature of from $-20°$ C. to $40°$ C. as the binder, the difference in the glass transition temperature between the polyurethane resin for the upper layer and the polyurethane resin for the lower layer is at least $10°$ C., the amount of polyurethane resin is from 5% to 70% by weight of the entire binder composition of each layer, and the coercive force of the ferromagnetic powder for the upper magnetic layer is from 350 to 2,500 Oe.

6. A magnetic recording medium as claimed in claim 5, wherein said upper magnetic layer is coated on said lower magnetic layer while said lower layer is in a wet condition, and thereafter said lower and upper magnetic layers are oriented, dried and surface-treated.

7. A magnetic recording medium as claimed in claim 5, wherein the amount of said polyurethane resin in each of said lower magnetic layer and said upper magnetic layer is from 10 to 70 wt% of the total of the binders in said lower and upper magnetic layers.

8. A magnetic recording medium as claimed in claim 5, wherein the difference in the glass transition temperature of the polyurethane resin in the lower magnetic layer and the polyurethane resin in the upper magnetic layer is at least $20°$ C.

9. A magnetic recording medium as claimed in claim 5, wherein the amount of the binder in each of the lower magnetic layer and the upper magnetic layer is from 10 to 70 wt% of the amount of the ferromagnetic powder in each layer.

10. A magnetic recording medium as claimed in claim 5, wherein said lower magnetic layer and said upper magnetic layer further contain a polyisocyanate hardening agent as a binder component.

11. A magnetic recording medium as claimed in claim 5, wherein said lower magnetic layer and said upper magnetic layer further contain a vinyl chloride copolymer resin or a cellulose resin as a binder component.

12. A magnetic recording medium as claimed in claim 5, wherein the dry thickness of said lower magnetic layer is at least 2 μm and the dry thickness of said upper magnetic layer is not thicker than 1.5 μm.

13. A magnetic recording medium as claimed in claim 5, wherein the coercive force of said upper magnetic layer is from 400 to 2,200 Oe and the coercive force of said lower magnetic layer is from 10 times to 0.1 times that of said upper magnetic layer.

* * * * *